(12) United States Patent
Okamoto et al.

(10) Patent No.: US 7,675,279 B2
(45) Date of Patent: Mar. 9, 2010

(54) SWITCHING REGULATOR SOFT START CIRCUITRY USING A D/A CONVERTER

(75) Inventors: Naruhiro Okamoto, Kyoto (JP); Michiaki Yama, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 339 days.

(21) Appl. No.: 11/721,868

(22) PCT Filed: Dec. 14, 2005

(86) PCT No.: PCT/JP2005/022932

§ 371 (c)(1),
(2), (4) Date: Jun. 15, 2007

(87) PCT Pub. No.: WO2006/068012

PCT Pub. Date: Jun. 29, 2006

(65) Prior Publication Data

US 2009/0273324 A1 Nov. 5, 2009

(30) Foreign Application Priority Data

Dec. 21, 2004 (JP) .............................. 2004-368707

(51) Int. Cl.
*G05F 1/56* (2006.01)
(52) U.S. Cl. ...................................... 323/283; 323/901
(58) Field of Classification Search ................. 323/282, 323/283, 284, 901
See application file for complete search history.

(56) References Cited

U.S. PATENT DOCUMENTS

| 6,922,042 | B2 * | 7/2005 | Umemoto et al. | 323/283 |
| 6,969,977 | B1 * | 11/2005 | Smith | 323/222 |
| 7,002,330 | B2 * | 2/2006 | Kitani et al. | 323/284 |
| 7,009,371 | B2 * | 3/2006 | Nakata | 323/282 |
| 7,405,549 | B2 * | 7/2008 | Kitagawa, Atsushi | 323/282 |
| 7,541,795 | B1 * | 6/2009 | Smith et al. | 323/285 |

FOREIGN PATENT DOCUMENTS

| JP | 2731577 | 12/1997 |
| JP | 2003-324939 | 11/2003 |
| JP | 2004-023948 | 1/2004 |
| JP | 2004-272447 | 9/2004 |

* cited by examiner

*Primary Examiner*—Jeffrey L Sterrett
(74) *Attorney, Agent, or Firm*—Mattingly & Malur, P.C.

(57) ABSTRACT

A switching regulator which does not require a capacitor having large time constant as a soft start circuit, reduces variation of the soft start time and the time until a start of a power source voltage stabilizing control The output voltage signal of the soft start circuit is set to a step voltage signal which increases or decreases stepwise at a predetermined rate. A changing period of the step voltage signal is set to a predetermined period after a power source is turned ON. The changing period of the step voltage of the output signal of the soft start circuit is made larger than the predetermined period according to a timing of changing of the PWM pulse output from "H" to "L" or "L" to "H" after an initial period, and after the power source is turned ON by monitoring the PWM pulse output by a detection circuit.

14 Claims, 4 Drawing Sheets

<PWM COMPARATOR>

SWITCHING REGULATOR SOFT START CIRCUITRY USING A D/A CONVERTER

TECHNICAL FIELD

The present invention relates to a switching regulator and, in particular, to a switching regulator used in a DC/DC converter, which does not require a capacitor provided as a soft start circuit for obtaining large time constant and can be easily constructed as an IC capable of reducing variation of soft start time and shortening a time required to start a power source voltage stabilizing control.

BACKGROUND ART

In a portable audio device, a personal computer, a PHS, a portable telephone set or a portable electronic device, a power source circuit of a DC/DC converter constructed with a switching regulator for efficiently converting a power source voltage is utilized.

FIG. 4 is a block circuit diagram of an example of the switching regulator of the DC/DC converter of such kind.

A reference numeral 10 depicts a switching regulator circuit, 11 an error amplifier (Err), 12 a reference voltage generator circuit, 13 a PWM pulse generator circuit and 14 a driver. A reference numeral 15 depicts a switching circuit constructed with a series circuit of a P channel MOSFET Q and a Schottky diode D. The series circuit is provided between a power source line +Vcc (voltage of an input side DC power source) and ground GND.

A reference numeral 16 depicts an output terminal of the switching regulator circuit 10. A power capacitor Co is provided between the output terminal 16 and ground GND. An inductor L is provided between a connecting point between the transistor Q and the Schottky diode D and the output terminal 16. The inductor L is about 10 µH and the capacitor Co is about 150 µF. Further, a resistive voltage divider circuit 17 for detecting output voltage is provided between the output terminal 16 and ground GND. A voltage Vs detected by the resistive voltage divider circuit 17 is fed back to the error amplifier 11. The detection voltage Vs is compared in the error amplifier 11 with a comparative reference voltage Vref of the reference voltage generator circuit 12. An error voltage Eo (error detection signal) is generated in the error amplifier 11 correspondingly to a result of the comparison and inputted to the PWM pulse generator circuit 13. The PWM pulse generator circuit 13 is usually constructed with a comparator (COM) 13a and a triangular wave signal generator circuit 13b.

In the PWM pulse generator circuit 13, a voltage waveform generated by the triangular wave generator circuit 13b is compared in the comparator 13a with an error voltage Eo in the comparator 13a. The triangular wave signal is sliced by the error voltage Eo, which corresponds to a result of the comparison of the voltage Vs, with a comparative reference voltage Vref and a PWM pulse is generated correspondingly to a pulse width determined by the slicing and is supplied to the driver 14. The driver 14 ON/OFF controls the transistor Q correspondingly to the pulse width of the PWM pulse to generate lowered voltage (boosted voltage by a fly-back pulse when the driver 14 is of a voltage boost type) at the output terminal 16.

Incidentally, the Schottky diode D is a flywheel diode for returning a current from the inductor L to the latter when the transistor Q is turned OFF.

Therefore, the transistor Q is ON/OFF controlled in such that the voltage divided by the resistive voltage divider circuit 17, that is, the detection voltage Vs, becomes equal to the comparative reference voltage Vref. As a result, an output voltage Vo is generated at the output terminal 16 and the output voltage Vo is stabilized to an aimed constant voltage Vta.

Incidentally, the driver 14 may be deleted when the output of the comparator 13a can drive the transistor Q. In such case, the output of the comparator 13a is directly supplied to the transistor Q.

The resistive voltage divider circuit 17 is constructed with a series circuit of resistors R1 and R2. The comparator 13a has two (−) input terminals for signals to be compared and an output of a soft start circuit 18 is supplied to one of the (−) input terminals.

The soft start circuit 18 functions to gradually boost an output voltage of the driver 14 by changing duty cycle of the PWM pulse to gradually increase the pulse width of the drive pulse. Since the transistor Q is a P channel transistor in FIG. 4, the width of the drive pulse outputted by the driver 14 is gradually increased in a LOW level period correspondingly to the change of the pulse width of the PWM pulse, so that the ON period of the transistor Q is increased correspondingly.

As the soft start circuit 18, a voltage generator circuit using a CR time constant circuit having a charging voltage of a capacitor as a threshold of a triangular wave or a soft start voltage generator circuit (Patent Publication 1) which utilizes a counter and a D/A converter and generates a voltage signal rising stepwise correspondingly to a clock CLK is known.

Particularly, in the voltage generator circuit having the CR time constant circuit as the soft start circuit 18, a capacitance of a secondary side capacitor Co is large. With such soft start circuit, it is beneficial in preventing rush current in a circuit which requires large stability with respect to an output current and in controlling output timing in a multi-channel power source circuit.

By providing such soft start circuit 18, the ON state period of the switching transistor Q becomes gradually longer and the charging current of the capacitor Co is gradually increased. Thus, a large current is prevented from flowing to the capacitor Co in the non-charged state at a start time, so that the switching transistor Q is hardly broken.

Patent Publication 1: JP-2004-23948A

SUMMARY OF THE INVENTION

Problem to be Solved by the Invention

The time required for the soft start depends on the output current value and the capacitance of the secondary side capacitor Co. However, it is usual that the time until the output voltage Vo becomes an aimed voltage Vta or a nominal voltage near the voltage Vta is set in a range from 1 msec to 20 msec.

As described in Patent Publication 1, a soft start circuit using the conventional CR time constant circuit can not be constructed as an IC since capacitance of a capacitor for determining the time constant is large. On the other hand, although a soft start voltage generator circuit using a D/A converter shown in Patent Publication 1 can be constructed as an IC, the clock period is limited since the soft start voltage is increased in stepwise correspondingly to the clock CLK having fixed period and the start time depends on the clock period. Further, there is no margin in the time until a voltage of a triangular wave signal and a step voltage of the soft start, which are compared by a comparator, cross each other initially and there may be a case where the soft starting can not be exactly on time due to variation of amplitude of the triangular wave signal and variation of conversion characteristics of the D/A converter circuit. Therefore, a response until the generation of the output voltage Vo may be belated and/or the output voltage Vo hardly becomes the normal voltage.

In a case where the frequency of the triangular wave signal is high, when the clock period supplied to the D/A converter is made close to the period of the triangular wave signal or when the clock frequency is increased closer to the frequency of the triangular wave signal in order to move up the response, the soft start condition can not be achieved. In this case, the large capacitance of the secondary side capacitor Co becomes a problem. For example, when the capacitance and the output current of the capacitor Co are several hundreds μF and 100 μA, respectively, the rush current becomes several tens times or more so that the switching transistor Q may be broken.

Incidentally, in Patent Publication 1, the soft start is initiated by lowering the frequency of the triangular wave signal and by making the lower limit voltage of the triangular wave signal coincident with the voltage of the soft start voltage generator circuit. However, it is practically difficult to make the lower limit voltage of the triangular wave signal and the soft start voltage coincident due to variation of the circuit, so that a level regulator circuit, etc., becomes necessary. Further, when the frequency of the triangular wave signal is made high, it is impossible to start by making these voltages coincident.

On the other hand, when the clock period for soft start is elongated by lowering the clock frequency, the time required to achieve the normal voltage state becomes too long, so that variation of time up to the start of the power source voltage stabilizing control becomes large due to some difference of count value and variation of conversion characteristics of the D/A converter circuit. In a case where there are plural power source circuits and, particularly, when the power source circuits are of the multi-channel type, the power source voltage is to be controlled by soft start matched with one of them, which has maximum variation. Therefore, the stand-by time required to obtain stable voltages becomes long necessarily.

An object of the present invention is to provide a switching regulator, which does not use a large time constant capacitor as a soft start circuit and is suitable to be constructed as an IC.

Another object of the present invention is to provide a switching regulator capable of reducing variation of a soft start time and reducing the time required to start the power source voltage stabilizing control.

In order to achieve the above objects, the switching regulator according to the present invention, a portion or a whole portion of voltage outputted from an output terminal of the switching regulator to a load is fed back to one input of an error amplifier of the switching regulator and a predetermined constant voltage is inputted to the other input of the error amplifier to generate a PWM pulse having width, which is changed correspondingly to an output signal of the error amplifier and a predetermined stabilized voltage is generated by switching power from a DC power source correspondingly to the PWM pulse, is featured by comprising a triangular wave generator circuit for generating a triangular wave signal, a PWM pulse generator circuit for generating the PWM pulse by comparing the output signal voltage of the error amplifier with the triangular wave signal voltage, a detection circuit for detecting a change of the PWM pulse from High "H" level to Low "L" level or from "L" level to "H" level, and a soft start circuit for generating a voltage signal (step voltage signal), which is increased stepwise or reducing stepwise and is compared with the triangular wave signal, wherein a changing period of a step voltage of the step voltage signal is a predetermined period in an initial period of ON state of the power source, an initial voltage of the step voltage signal when the power source is turned ON is outside of a voltage amplitude range of the triangular wave signal, the period of the step voltage, which is changed correspondingly to the detection signal of the detection circuit, is switched to a period longer than a predetermined period and is suitable for soft start.

According to the present invention, the output voltage of the soft start circuit is a step voltage, which increases or decrease stepwise and the changing period of the step voltage is set to a predetermined period at a time when a power source is turned ON and, thereafter, is increased from the predetermined period with a timing of change from "H" to "L" or from "L" to "H" of the PWM pulse. Incidentally, since the "H" and "L" voltage levels are determined correspondingly to ON/OFF drive of a switching transistor, it is enough to have a relation satisfying "H">"L"

In an initial period after the power source is turned ON, the soft start circuit of the present invention generates the step voltage signal whose period is, for example, one fifth of the period of the step voltage signal suitable for the soft start or shorter. When the step voltage signal reaches a voltage level within the voltage range of the triangular wave signal, the detection circuit generates a detection signal. According to this detection signal, the period of the step voltage is set to one selected from a range, for example, from 50 to 600 times to enter the PWM control start state of the soft start. In the PWM control of soft start, the step voltage signal changes the pulse width of the PWM pulse with period suitable for the soft start.

In this case, the predetermined period in the initial state after the power source is turned ON may be selected from a range from 1/50 to 1/600 with using the period, during which the step voltage suitable for soft start (period of the step voltage when the PWM control of the soft start is initiated) is changed, as a reference.

The reason for this is that, when the time required for the soft start is in a range from 1 msec to 20 msec, the predetermined period becomes one-tenth of the period of the step voltage or less since the period of the step voltage suitable for the soft start becomes necessary to slice the triangular wave signal 10 times or more. The predetermined period suitable for the soft start becomes one-tenth of the period of the step voltage or less since the triangular wave signal is sliced 10 times or more.

Since an initial period after the power source is turned ON is a standby time until the PWM control of the soft start is started, the initial period is preferably shorter. Therefore, it is preferable that the predetermined period is one-fifth or smaller of one-tenth of the period of the step voltage suitable for soft start. This is because, when a period which is 1/10 of the period suitable for the soft start is a reference, it is possible to hold a voltage change of 5 times or more within the initial period after the power source voltage is supplied by making the period 1/5 or shorter of the reference.

Incidentally, when the number of slicing times is increased to 100 in lieu of 10 times or more for the triangular wave signal, the predetermined period becomes 1/500 and, when the number of slicing times is 120, the predetermined period becomes 1/600.

Therefore, since the voltage generated by the soft start circuit increases at higher period in the initial period after the power source voltage is turned ON, the voltage can reach the voltage level of the triangular wave signal at high speed even when the initial voltage of the step voltage signal is out of the voltage amplitude range of the triangular wave signal. Further, when it reaches the voltage level of the triangular wave signal, the detection circuit generates a detection signal and the step voltage signal is changed stepwise with the period suitable for the soft start.

Therefore, it is possible to enter into the soft start PWM control initiation state earlier and it is possible to generate the step voltage signal having the period suitable for the soft start in the soft start circuit.

In this invention, since the soft start circuit generates the stepwise voltage signal, there is no need of providing the time constant circuit. When the PWM soft start control is initiated, the amplitude of the triangular wave signal is sliced by the step voltage with the optimum period from the start time. Therefore, variation of the slicing number of the triangular wave signal is substantially disappeared due to considerable relation to the increasing rate or decreasing rate of the step voltage, even if the amplitude of the triangular wave signal and the step voltage are somewhat varied and variation of the soft start time is reduced.

As a result, the capacitor having large time constant becomes unnecessary as the soft start circuit, can reduce variation of the soft start time is reduced and a time until a start of the power source voltage stabilizing control is reduced. Thus, it is possible to realize the switching regulator which can be fabricated as an IC.

DETAILED DESCRIPTION OF PREFERRED EMBODIMENTS

Figure 1:
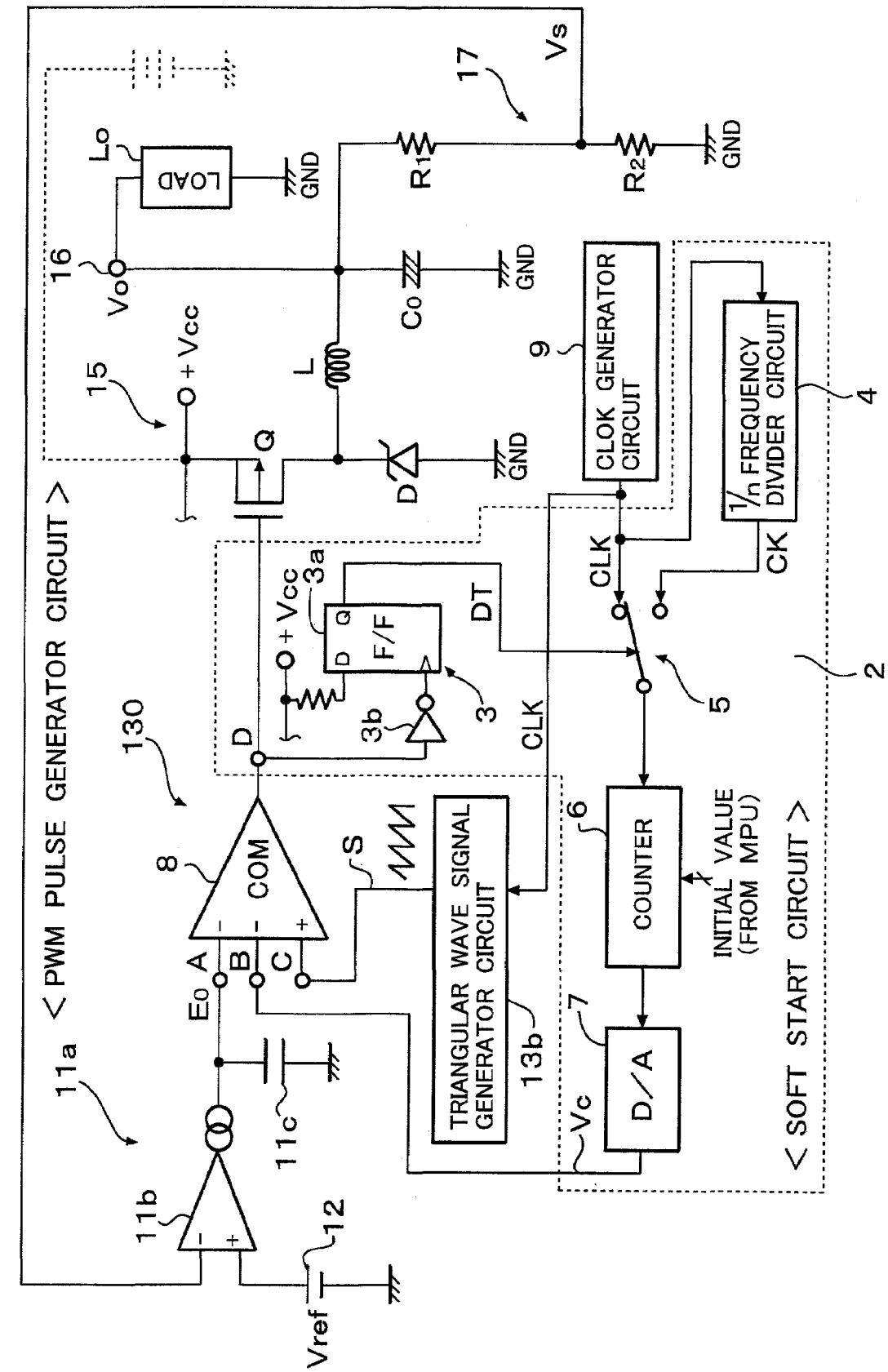
FIG. 1 is a block circuit diagram of a switching regulator according to an embodiment of the present invention.
Figure 4:
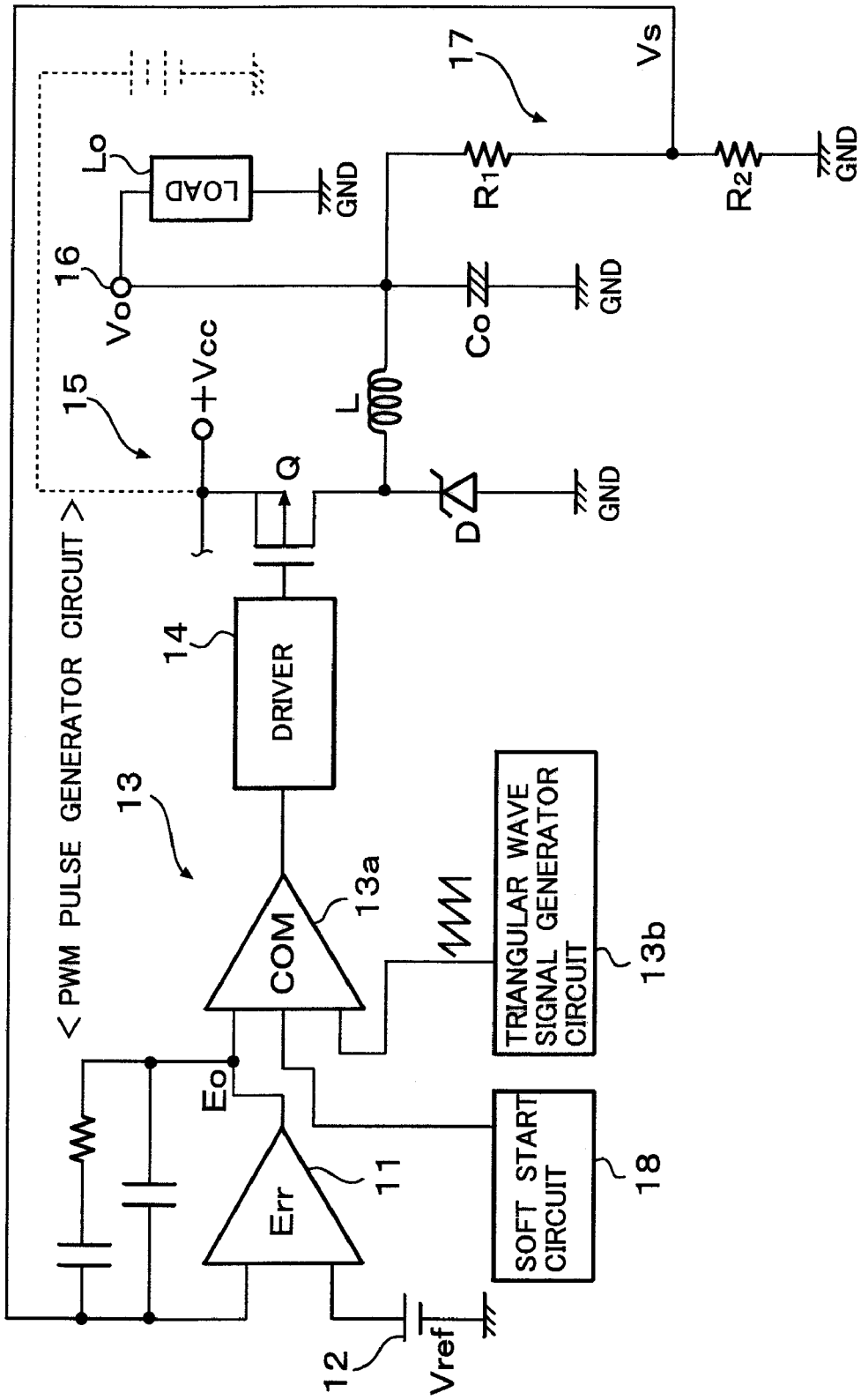

In a switching regulator 1 shown in FIG. 1, a soft start circuit 2 is used in lieu of the soft start circuit 18 shown in FIG. 4.

A reference numeral 130 depicts a PWM pulse generator circuit constructed with the soft start circuit 2, a PWM comparator 8 and a triangular wave generator circuit 13b.

The soft start circuit 2 generates a step voltage signal ST (see FIG. 3(a)) for generating step voltages having short period and long period. The soft start circuit 2 is constructed with a PWM control initiation detection circuit 3, a 1/n frequency divider circuit 4, a selector 5, a counter 6 and a D/A converter circuit (D/A) 7. The counter 6 receives a clock CLK and a clock CK having frequency obtained by dividing the frequency of the clock CLK by the 1/n frequency divider circuit 4. Incidentally, though the driver 14 shown in FIG. 4 is deleted in FIG. 1, the driver 14 may be used.

The selector 5 switches the clock CLK generated by the clock generator circuit 9 to the clock CK generated by the 1/n frequency divider circuit 4 according to an output of the PWM control start detection circuit 3. In this embodiment, frequency dividing rate n is set to 300 so that the frequency of the clock CLK is divided by 300 to generate the clock CK (frequency divided clock) having period T=300×t. Incidentally, t is the period of the clock CLK. Frequency dividing rate n gives the period suitable for soft start to the frequency divided clock CK by using, as a reference, a time required to rise an output voltage Vo to an aimed voltage Vta voltage (normal voltage) close to the aimed voltage, that is, 1 msec to 20 msec. It is preferable to generate the frequency divided clock CK having a period which is 1/20 to 1/50 of the period which is about 1 msec to 20 msec. Assuming that the period of the clock CLK is several microseconds and the period of the frequency divided clock CK is several hundreds microseconds, the frequency dividing rate n is preferably selected in a range from 50 to 600.

The triangular wave signal generator circuit 13b responds to the clock CLK from the clock generator circuit 9 to generate a triangular wave signal S (see FIG. 3(a)) having period corresponding to the period of the clock CLK.

The D/A converter 7 converts the count value of the counter 6 into an analog voltage signal Vc which is supplied to a (−) input terminal B of a PWM pulse generating comparator 8 (referred to as "PWM comparator", hereinafter). The PWM comparator 8 which corresponds to the comparator 13a shown in FIG. 4 has a (−) input terminal A to which an output voltage Eo of the error amplifier 11a is supplied.

Incidentally, the triangular wave signal S from the triangular wave generator circuit 13b is supplied to a (+) input terminal C of the PWM comparator 8.

The error amplifier 11a, which corresponds to the error amplifier 11 shown in FIG. 4, is constructed with a current output amplifier 11b and a capacitor 11c which converts the output current of the current output amplifier 11b into the voltage signal Eo which is supplied to the input terminal A of the PWM comparator 8. The voltage signal Eo is an error voltage generated correspondingly to a difference between the detection signal Vs corresponding to the output voltage value Vo and the reference voltage value Vref of the reference voltage generator circuit 12.

The PWM control start detection circuit 3 is constructed with a latch circuit 3a having a flip-flop construction and the inverter 3b which is connected to an output (the output of the driver 14 when the latter is provided) of the PWM comparator 8. When the output of the PWM comparator 8 is changed from "H" to "L", the inverter 3b of the PWM control initiation detector circuit 3 inverts it and the latch circuit 3a latches data "1" by the data terminal D of the latch circuit 3a, which is pulled up to the power source voltage +Vcc. The latch circuit 3a outputs "H" at the output Q thereof as the detection signal DT which is supplied to the selector 5.

Incidentally, in the initial state after the power source is turned ON, the set value of the latch circuit 3a is cleared and the Q output becomes "L". The data "1" latched by the latch circuit 3a is held as it is so long as it is not reset, that is, so long as the power source is not turned ON again.

In the initial state after the power source is turned ON, the selector 5 responds to "L" from the latch circuit 3a to select the output side of the clock generator circuit 9 and adds the clock CLK to the counter 6. When the latch circuit 3a becomes "H", the output side of the 1/n frequency divider circuit 4 is selected to add the frequency divided clock CK to the counter 6.

As a result, the counter 6 counts up the fast clock CLK in a period t from a time when the power source is turned ON to a time when "H" is set in the latch circuit 3a, in other words, from the time when the power source is turned ON to the initiation time of the PWM control of the soft start. The PWM control of the soft start is initiated when "H" is set in the latch circuit 3a and the counter 6 starts counting of the slow frequency divided clock CK (=300×clock CLK) in every period T (=300 t) from a time point when "H" is set in the latch circuit 3a.

Figure 3:
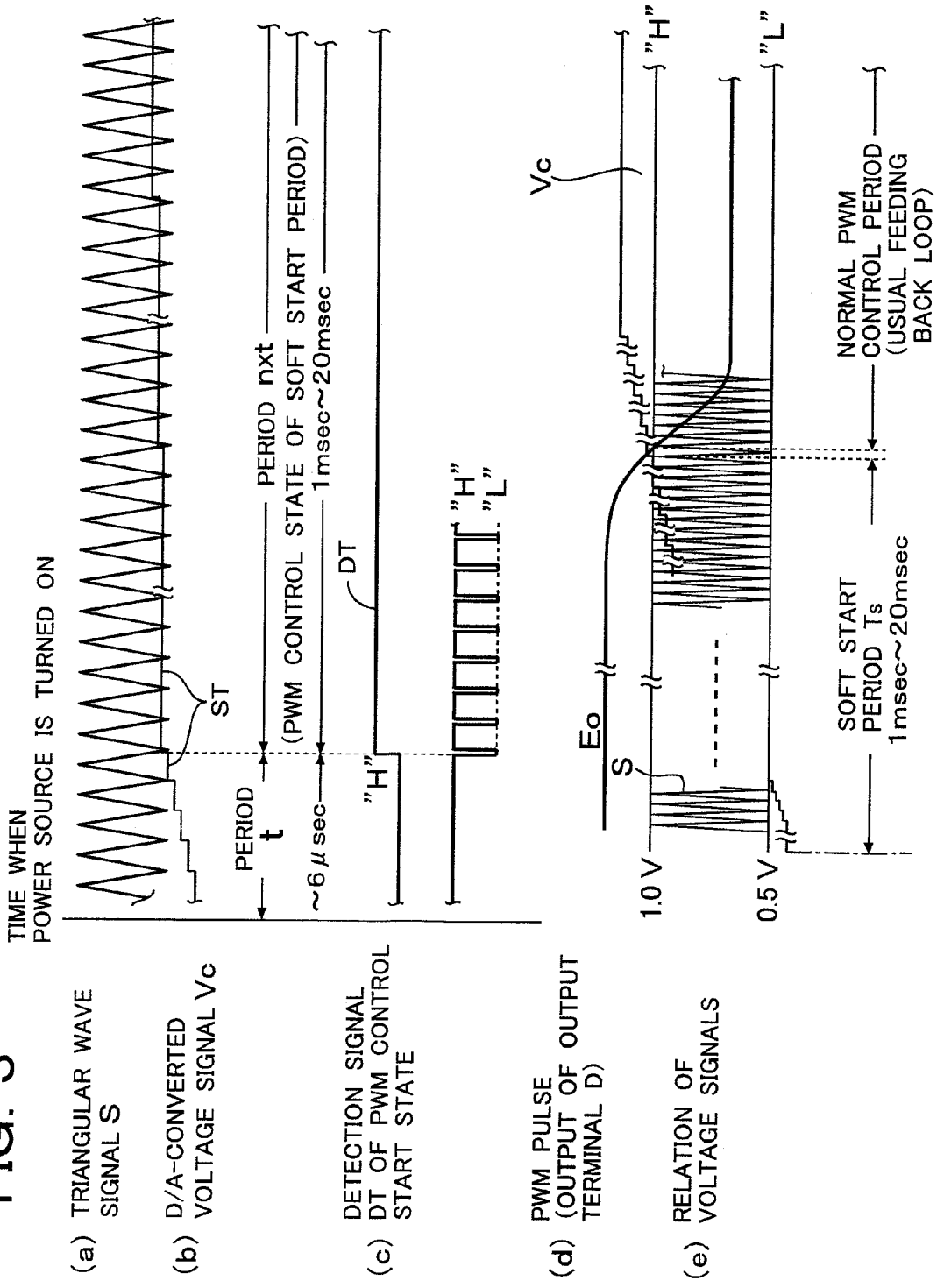
FIG. 3 is a timing chart for explaining a soft start operation and FIG. 4 is a conventional construction of a soft start circuit. Incidentally, constructive components which are identical to those shown in FIG. 4 are depicted by same reference numerals, respectively, and the description of these components is omitted.

The PWM comparator 8 decides the voltage comparison between the analog converted voltage signal Vc at the (−) input terminal B and the triangular wave signal S in the initial period as effective and the voltage comparison between the voltage signal Eo and the triangular wave signal S after a predetermined soft start time TS (=a time period of 1 msec to 20 msec) (see FIG. 3(*e*)) as effective. Therefore, the PWM comparator 8 performs logical sum operation with respect to the input signals at the two (−) input terminals A and B.

Figure 2:
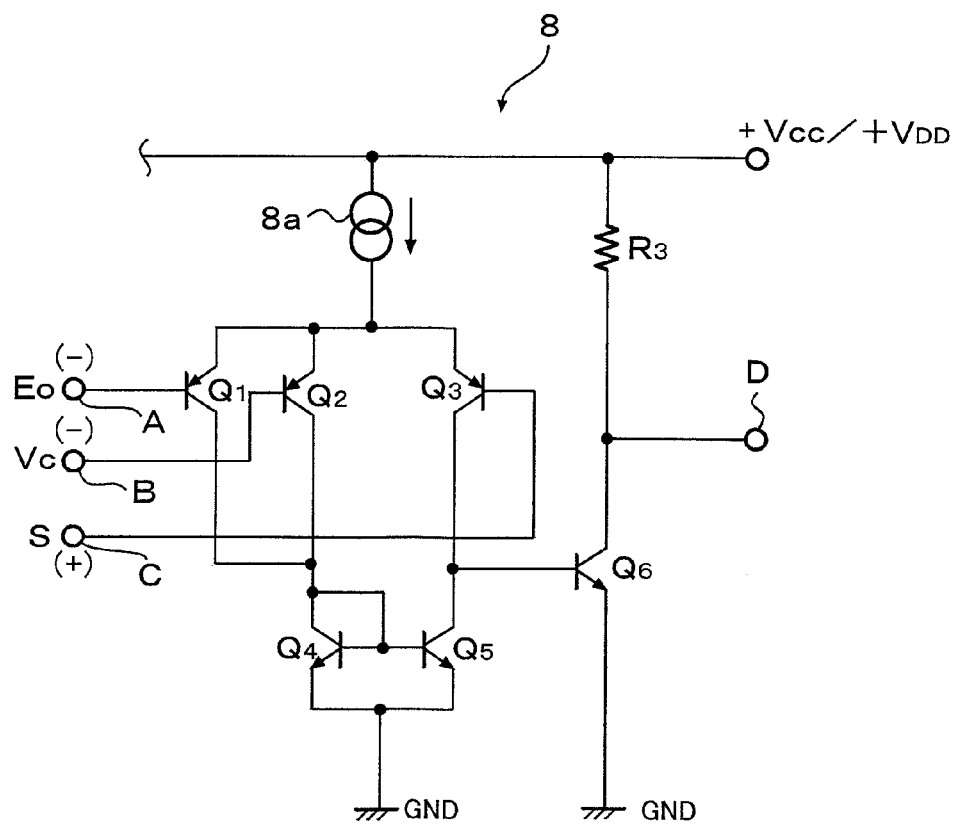
FIG. 2 shows a concrete circuit construction of a PWM pulse generating comparator.

As shown in FIG. 2, the PWM comparator 8 is constructed with a current switch circuit in which a PNP transistor Q3 is paired commonly with two parallel PNP transistors Q1 and Q2. A base of the transistor Q1 is connected to a (−) input terminal A and a base of the transistor Q2 is connected to a (−) input terminal B. A base of the transistor Q3 is connected to the (+) input terminal C.

Emitters of the transistors Q1, Q2 and Q3 are commonly connected to the power source line +Vcc (or +VDD) through a constant current circuit 8*a*. Collectors of the transistors Q1 and Q2 are commonly connected and these collectors and a collector of the transistor Q3 are grounded through NPN transistors Q4 and Q5, which constitute an active load current mirror circuit. A corrector of the transistor Q5 is connected to a base of a PNP transistor Q6. A collector of the transistor Q6 is connected to an output terminal D of the PWM comparator 8 and to the power source line +VDD through a resistor R3 and an emitter of the transistor Q6 is grounded.

Since the voltage at the output terminal Vo is not risen at the time when the power source is turned ON, the voltage signal Eo having large error voltage is generated and becomes higher than "H". On the other hand, the upper limit voltage of the triangular wave signal S is set to "H". Therefore, the transistor Q1 is in OFF state.

On the other hand, the output analog voltage Vc of the D/A converter 7 is supplied to the base of the transistor Q2 through the (−) input terminal B of the PWM comparator 8. Therefore, the transistor Q2 is driven by the analog voltage Vc to generate a PWM pulse (output voltage), which has pulse width corresponding to the input voltage of the (−) input terminal B, at the output terminal D of the PWM comparator 8.

Incidentally, a step voltage signal ST (see FIG. 3(*a*)) is supplied from the soft start circuit 2 to the (−) input terminal B.

Now, the generation of the step voltage signal ST in the soft start circuit 2 will be described.

A predetermined count value is set in the counter 6 in the initial state and the counter 6 starts counting the clock CLK from the initial value. The initial value of the counter 6 in this case is to set the voltage Vc obtained by D/A converting the initial value by the D/A converter slightly lower the lower limit of the triangular wave signal S (see FIG. 3(*a*) and FIG. 3(*b*)). This is the initial voltage of the step voltage signal ST.

Assuming that, for example, "L" is 0.5V and "H" is about 1.0V, the triangular wave signal S in a range from 0.5V to 1.0V is generated.

In this embodiment, the rising rate of the step voltage of the step voltage signal ST is selected such that the time period from a time when the voltage of the step voltage signal ST enters into the amplitude range (0.5V to 1.0V) of the triangular wave signal S to a time when it becomes out of the amplitude range becomes correspondent to the time TS (=1 msec to 20 msec) required for the soft start.

The initial voltage value of the step voltage signal ST is set such that the voltage Vc from the D/A converter 7 of about 490 mV (=0.5V—10 mV) is generated. In the present invention, it is possible to set this initial voltage value to a value lower than the lower limit voltage of the triangular wave signal S by about 2% to 5%. This is because the initial stage voltage generated by the soft start circuit 8 can rise with resolution as high as several mV/LSB by changing the D/A conversion period to a period corresponding to the period of the triangular wave signal S.

Incidentally, the step voltage signal ST generates the step voltage rising with several mV/LSB. The several mV is within a range which can be absorbed even when there is some variation of the amplitude of the triangular wave signal and/or the step voltage.

The initial value is set in the counter 6 by an MPU (not shown), etc., and can be stored in such as nonvolatile memory as a regulated data such that the initial voltage of the step voltage signal ST becomes a value lower than the lower limit voltage of the triangular wave signal S by 2% to 5% correspondingly to variation of the circuit construction.

The soft start circuit 2 generates the step voltage signal ST which increases stepwise in units of several mV and, in the initial period, generates the step voltage signal ST having short period corresponding to the period of the clock CLK. When the step voltage signal ST reaches a voltage level within the voltage range of the triangular wave signal, the operation enters into the PWM control initiation state of the soft start. In the PWM control of the soft start, the step voltage signal ST having the long period corresponding to the frequency divided clock CK changes the pulse width of the PWM pulse with a period suitable for the soft start.

The soft start operation of the switching regulator 1 will be described with reference to the timing chart shown in FIG. 3.

When the initiation of the switching regulator 1 is started by turning the power source ON, the initial value is set in the counter 6 and the voltage, which is lower than the lower limit voltage value of the triangular wave signal S by about 10 mV (=0.5V×0.02) and corresponds to the initial value, is generated at the output terminal D of the PWM comparator 8 and is gradually increased correspondingly to the clock CLK, as shown in FIG. 3(*a*).

In this case, since the selector 5 receives the "L" from the latch circuit 3*a* in the initial period, the count value of the counter 6 is increased stepwise in the period t of the clock CLK from the clock generator circuit 9. Assuming, for example, the period t is 1.5 μsec, the lower limit voltage of the triangular wave signal is 0.5V and the resolution of the D/A converter circuit 7 is 3.0 mV/LSB, the step voltage signal ST can reach the edge of the triangular wave signal S from the time when the power source is turned ON by several μsec to 6 μsec (see the slice period of the period t in FIG. 3(*b*)). Since the input voltage of the (−) input terminal B is always lower than the voltage of the triangular wave signal S for this period, the voltage signal in a predetermined voltage level, which is enough to turn the switching transistor Q OFF and corresponds to "H" or higher, is outputted to the output terminal D of the PWM comparator 8 (see FIG. 3(*d*)).

At time when the voltage Vc from the D/A converter 7 reaches the edge of the triangular wave signal S and the input voltage of the (−) input B becomes higher than the lower limit voltage of the triangular wave signal S, the PWM control of the soft start enters into the initiation state. In this case, pulse signal having narrow width corresponding to the period t of the clock CLK is generated at the output terminal D of the PWM comparator 8. According to the first signal of the "L" pulse signal, "H" is added to the latch circuit 3*a* through the inverter 3*b* and "1" is latched therein. Therefore, "H" output is generated at the Q output of the latch circuit 3*a* (see FIG. 3(*b*)) and the detection signal DT is generated. As a result, the selector 5 is switched to the 1/n frequency divider circuit 4.

Thus, the counting up period of the counter 6 becomes n×t, that is, it becomes 300 times the clock CLK, so that the "L" output is generated at the output terminal D of the PWM comparator 8 in the period of the triangular wave signal S (the period of the clock CLK). The PWM pulse whose "L" period is increased every n clocks CLK is obtained at the output terminal D.

The PWM pulse whose "L" period is increased every n clocks CLK is applied to the switching transistor Q, so that the switching transistor Q is chopped by the period (the period of the clock CLK) of the triangular wave signal S to turn the switching transistor Q ON intermittently. Therefore, the ON period of the PWM pulse is gradually increased (see FIG. 3(a)).

Thus, the output voltage Vo is soft-started.

When the analog voltage Vc of the D/A converter 7 exceeds the upper limit voltage 1.0V of the triangular wave signal S, duty cycle of the PWM pulse becomes 100% and the switching transistor Q becomes ON state. In this case, since the charging of the capacitor Co is substantially completed, the output signal Vo approaches the aimed voltage Vta. Therefore, the detection voltage Vs of the voltage dividing resistor circuit 17 approaches the comparison reference voltage Vref of the reference voltage generator circuit 12 and the output voltage Eo of the error amplifier 11a is lowered correspondingly (see FIG. 3(e)). On the other hand, the analog voltage Vc of the D/A converter 7 is increased with increase of the count value of the counter 6 and exceeds the upper limit 1.0V of the triangular wave signal.

Incidentally, since the time which is from several μsec to 6 μsec for which the step voltage signal ST shown in FIG. 3(b) reaches the edge of the triangular wave signal S is negligible compared with the time T in a range from 1 msec to 20 msec, the time is not shown in FIG. 3(e) exceptionally.

At the time when the analog voltage Vc exceeds the upper limit value of the triangular wave signal, the transistor Q2 is turned OFF and, at the time when the output voltage Eo is lowered from the upper limit value of the triangular wave signal, the transistor Q1 is turned ON.

By selecting the resolution and the frequency dividing rate n of the D/A converter 7 such that the timing of the reduction of the output voltage Eo below the upper limit value of the triangular wave signal S and the timing of the turning OFF of the transistor Q2 become in the vicinity of the upper limit value of the triangular wave signal S, which the switching timing of the transistors Q1 and Q2 occurs in the vicinity of the upper limit value of the triangular wave signal S and the time when the switching is over becomes the predetermined soft start time Ts (=1 msec to 20 msec) and the PWM control of the soft start is ended.

When the output voltage Eo becomes lower than the upper limit value of the triangular wave signal S, the transistor Q1 is ON/OFF controlled correspondingly to the output voltage Eo of the error amplifier 11a and the operation is switched to the stable control of the output voltage Vo by usual PWM (normal PWM control) as shown in FIG. 3(e).

In the described embodiment, the period of the clock CLK generated by the clock generator circuit 9 corresponds to the period of the triangular wave signal S. However, since it is unnecessary to slice the triangular wave signal S until it reaches the lower limit voltage of the triangular wave signal S, the period of the clock CLK may be shorter than that. On the contrary, when the frequency of the triangular wave signal S is made twice or three times the frequency used in the described embodiment or higher, the period of the clock CLK until it reaches the lower limit voltage of the triangular wave signal becomes twice, three or more times the period of the triangular wave signal S.

Therefore, the frequency of the triangular wave signal S and the period of the clock CLK are relative. In the described embodiment in which the usual soft start period is 1 msec to 20 msec, the frequency dividing rate n is selected from n=50 to 600. Assuming that the period of the frequency dividing clock CK under the starting condition of the soft start PWM control starting state is the reference, the optimum period of the clock CLK is selected from 1/50 to 1/600 of the period of the frequency divided clock CK.

Further, in the described embodiment, the initial voltage value generated in the soft start circuit 2 is set in a level slightly lower than the lower limit of the triangular wave signal S. However, when the switching transistor Q is an N channel MOS transistor, the switching transistor Q is turned ON when the output of the PWM comparator 8 is "H". In such case, the initial voltage value generated by the soft start circuit 2 (the voltage value of the D/A converter 7) is set in slightly higher than the upper limit value of the triangular wave signal S and the control is performed by gradually lowering the voltage generated by the soft start circuit 2 (the analog voltage Vc of the D/A converter 7). In this case, the counter 6 counts down from the initial large value.

It is preferable that the initial voltage value generated by the soft start circuit 2 (the analog voltage Vc outputted from the D/A converter 7) is set to a value higher by 3 mV to 15 mV than the upper limit voltage of the triangular wave signal S, that is, by 1% to 2.5% than the upper limit voltage.

Further, it is possible to supply the triangular wave signal S to the (−) input terminal of the PWM comparator 8 and supply the triangular wave signal and the output signals from the soft start circuit 2 and the error amplifier 11a to the (+) input terminals of the PWM comparator 8. In such case, the initial voltage generated by the soft start circuit 2 is set to a value slightly higher than the upper limit of the triangular wave signal S and the voltage generated by the soft start circuit 2 (output voltage of the D/A converter 7) is lowered gradually from the set value.

Further, although the switching transistor is the MOS transistor in the described embodiment, it is of course possible to use a bipolar transistor.

The construction of the PWM comparator 8 in the described embodiment is an example and any construction may be used provided that it compares the step voltage signal ST with the voltage of the triangular wave signal S before the time period TS (1 msec to 20 msec) necessary for the soft start and compares the output signal of the error amplifier with the voltage of the triangular wave signal after the period TS. In this invention, the comparator is not limited to the comparator having 2 inputs.

For example, it is possible to use a circuit which includes a first comparator for comparing the signal at the (−) input terminal with the triangular wave signal S and a second comparator for comparing the signal at the (+) input terminal with the triangular wave signal S and to drive the switching transistor Q under the previously mentioned logical sum condition of outputs of the first and second comparators.

As described hereinbefore, the voltage lowering type switch regulator is used in the embodiment. However, it is of course possible to apply this invention to the voltage increasing type DC/DC converter.

The invention claimed is:

1. A switching regulator for generating a predetermined stabilized voltage at an output terminal of said switching regulator by feeding back a portion or a whole portion of a voltage outputted from said output terminal to a load back to one of inputs of an error amplifier, applying a predetermined constant voltage to the other input of said error amplifier to generate a PWM pulse having a pulse width which is changed according to an output signal of said error amplifier and switching a D.C. power source according to the PWM pulse, comprising:

a triangular wave generator circuit for generating a triangular wave signal;

a PWM pulse generator circuit for generating the PWM pulse by comparing the voltage of the output signal of said error amplifier with a voltage of the triangular wave signal;

a detection circuit for detecting a change of the PWM pulse from High level to Low level or vice versa; and a soft start circuit for generating a voltage signal which gradually increases stepwise or gradually reduces stepwise and a step voltage of the voltage signal is compared with the voltage of the triangular wave signal, a changing period of the step voltage of said soft start circuit being a predetermined period in an initial period after the power is supplied and an initial voltage of the voltage signal when the power is supplied being outside of a voltage amplitude range of the triangular wave signal, the changing period of the step voltage according to the detection signal of said detection circuit being switched to a period which is larger than the predetermined period and is suitable for a soft start.

2. A switching regulator as claimed in claim 1, wherein, in the initial period after the power is supplied, the PWM pulse is in High level or Low level.

3. A switching regulator as claimed in claim 2, wherein the PWM pulse becomes either the High level or the Low level in the initial period after the power is supplied, when the initial voltage of the voltage signal is outside of the voltage amplitude range of the triangular wave signal, by comparing the step voltage with the voltage of the triangular wave signal.

4. A switching regulator as claimed in claim 3, wherein said PWM pulse generator circuit includes a comparator receiving the voltage signal from said soft start circuit for comparing the step voltage with the voltage of the triangular wave signal, the PWM pulse becomes the either level according to a result of comparison of said comparator and the PWM pulse having pulse width which changes with a period suitable for the soft start is generated when the step voltage enters into the voltage amplitude range of the triangular wave signal.

5. A switching regulator as claimed in claim 4, wherein said comparator compares the step signal voltage with the triangular wave signal voltage before the elapsed time necessary for the soft start and compares the output signal voltage of the error amplifier with the triangular wave signal voltage after the elapsed time.

6. A switching regulator as claimed in claim 5, wherein, in the initial period after the start of power supply, said comparator compares the step voltage with the triangular wave signal voltage and provides a result of the comparison as effective and, according to the value of the output signal voltage of the error amplifier, compares the output signal voltage of said error amplifier with the triangular wave signal voltage and provides a result of the comparison as effective.

7. A switching regular as claimed in claim 6, wherein said comparator has a first input terminal, a second input terminal and a third input terminal, said first input terminal receives the output signal of said error amplifier, said second input terminal receives the step voltage, said third input terminal receives the triangular wave signal, the elapsed time necessary for the soft start is selected from a range from 1 msec to 20 msec, the period suitable for the soft star is in a range from $\frac{1}{20}$ to $\frac{1}{50}$ of the selected period.

8. A switching regulator as claim in claim 7, wherein said comparator compares a logical sum of the output signal voltage of said error amplifier and the step voltage, the step voltage is increased stepwise at a predetermined rate, and the predetermined rate is selected in such a way that a period from a time when the step voltage of the voltage signal enters into the amplitude range of the triangular wave signal to a time when the step voltage of the voltage signal goes out from the amplitude range corresponds to the elapsed time necessary for the soft start.

9. A switching regulator as claimed in claim 7, wherein said predetermined period corresponds to the period of the triangular wave signal or shorter.

10. A switching regulator as claimed in claim 7, wherein said predetermined period is selected from a range from $\frac{1}{50}$ to $\frac{1}{600}$ of the period suitable for the soft start.

11. A switching regulator as claimed in claim 3, wherein the initial voltage is slightly outside of the voltage amplitude range of the triangular wave signal, said PWM pulse generator circuit includes a comparator for comparing two signal voltages with the triangular wave signal voltage, one of the two input signals is the output signal of the error amplifier and the other input signal is the voltage signal of said soft start circuit, the comparison between the voltage signal voltage and the triangular wave signal voltage is outputted by said comparator as effective in the initial period after the power is supplied and the comparison between the output signal voltage and the triangular wave signal voltage is outputted by said comparator after the elapsed time necessary for the soft start as effective.

12. A switching regulator as claimed in claim 11, further comprising a clock signal generator circuit, wherein said soft start circuit includes a counter and a D/A converter circuit, the voltage signal is generated by D/A converting a count value of said counter by said D/A converter circuit, said counter counts a clock from said clock generator circuit in the initial period after the power is supplied and said counter counts a clock signal having period longer than the clocks according to the detection signal.

13. A switching regulator as claimed in claim 12, wherein the period of the clock substantially corresponds to the period of the triangular wave signal, the period of the clock signal is 50 to 600 times the period of the clock and a value corresponding to the initial voltage is set in said counter as the initial value.

14. A switching regulator as claimed in claim 13, wherein said soft start circuit includes a selection circuit and a frequency divider circuit, the initial voltage slightly outside of the voltage amplitude range of the triangular wave signal is within a range of a potential difference of 3 to 15 mV from an upper limit voltage or a lower limit voltage of the voltage amplitude of the triangular wave signal, the clock signal having the period longer than the period of the clock, the clock frequency is divided by said frequency divider circuit and said selection circuit switches the clock to the clock signal in response to the detection signal and outputs the clock signal to said counter.

* * * * *